(12) United States Patent
Akutsu

(10) Patent No.: US 12,174,088 B2
(45) Date of Patent: Dec. 24, 2024

(54) VEHICLE VIBRATION DEVICE

(71) Applicant: HONDA MOTOR CO., LTD., Tokyo (JP)

(72) Inventor: Susumu Akutsu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 321 days.

(21) Appl. No.: 17/820,565

(22) Filed: Aug. 18, 2022

(65) Prior Publication Data

US 2023/0114109 A1 Apr. 13, 2023

(30) Foreign Application Priority Data

Sep. 30, 2021 (JP) .................................. 2021-162231

(51) Int. Cl.
*G01M 17/007* (2006.01)
(52) U.S. Cl.
CPC .... *G01M 17/0078* (2013.01); *G01M 17/0072* (2013.01)
(58) Field of Classification Search
CPC ......... G01M 17/00–06; G01M 17/007; G01M 17/0072; G01M 17/0078; G01M 7/02
See application file for complete search history.

(56) References Cited

FOREIGN PATENT DOCUMENTS

| DE | 10305346 A1 | * | 8/2004 | ........ G01M 17/0074 |
| JP | 2017009545 A | * | 1/2017 | .......... G01M 17/007 |
| WO | 2020218251 A1 | | 10/2020 | |

OTHER PUBLICATIONS

Machine Translation of DE-10305346-A1 (Year: 2004).*
Machine Translation of JP-2017009545-A (Year: 2017).*

* cited by examiner

*Primary Examiner* — Nguyen Q. Ha
(74) *Attorney, Agent, or Firm* — CKC & Partners Co. LLC

(57) ABSTRACT

In a vehicle vibration device including a first shaft and a second shaft extending in a left-right direction at such a spacing that each of wheels of a vehicle to be inspected is sandwiched therebetween in a front-rear direction and a movement mechanism that moves the first shaft, the first shaft being moved in a front-rear and horizontal direction by the movement mechanism to excite the wheel to vibration in front-rear and up-down directions, a support member that supports the wheel from below is provided between the first shaft and the second shaft. As a result, a vibration force produced by a front-side shaft is effectively transmitted to the wheel over an entire vibration frequency range in a vibration test.

3 Claims, 8 Drawing Sheets

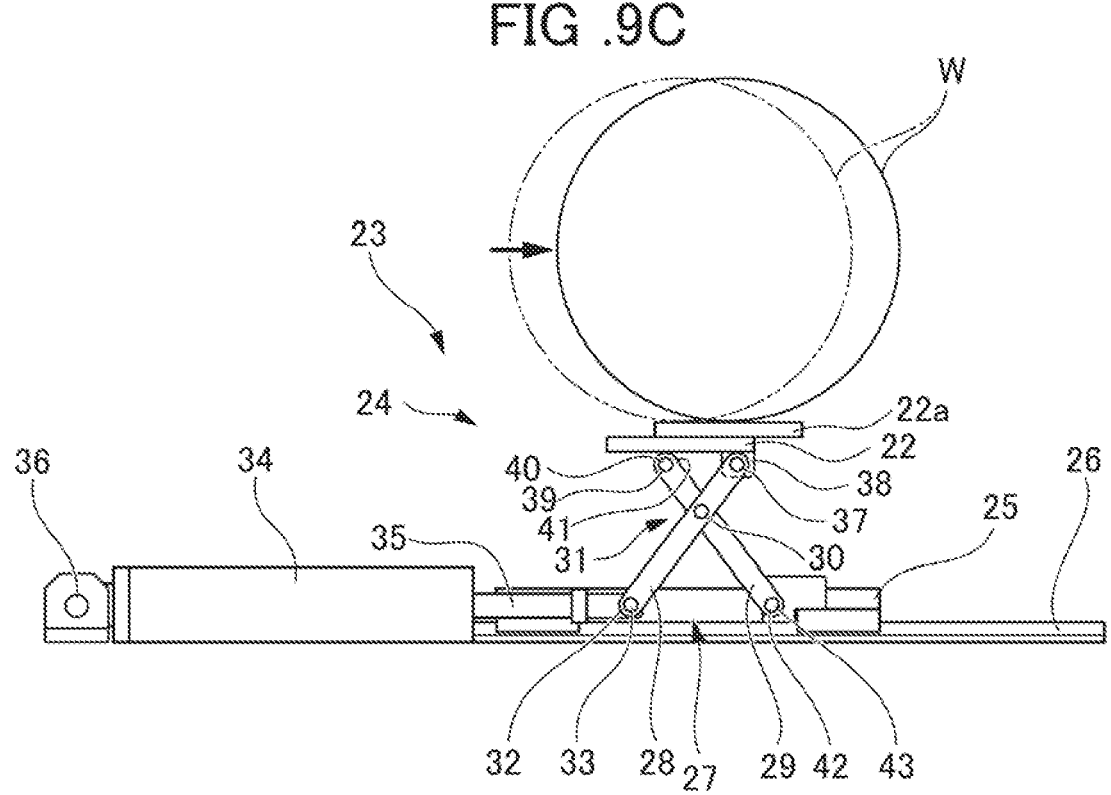

VEHICLE VIBRATION DEVICE

This application is based on and claims the benefit of priority from Japanese Patent Application No. 2021-162231, filed on 30 Sep. 2021, the content of which is incorporated herein by reference.

BACKGROUND OF THE INVENTION

Field of the Invention

The present invention relates to a vehicle vibration device.

Related Art

To inspect durability of a vehicle and quietness in the vehicle, for example, a vibration device that vibrates the vehicle to vibration has been used. There has been proposed a vehicle vibration device that vibrates the wheels of a vehicle to vibrate in front-rear and up-down directions by sandwiching each of the wheels in the front-rear direction between a front-side shaft and a rear-side shaft extending in a left-right direction and moving the front-side shaft in a front-rear and horizontal direction (see, e.g., Patent Document 1).

Patent Document 1: PCT International Publication No. WO2020/218251

SUMMARY OF THE INVENTION

However, the vehicle vibration device described in Patent Document 1 has a disadvantage that a vibration force in a specific vibration frequency range produced by the front-side shaft is not sufficiently transmitted to the wheels due to a circumferential deflection of the wheels. In Patent Document 1, this disadvantage is not presented as an issue.

The present invention has been made in view of the above-described circumstances, and is directed to providing a vehicle vibration device in which a vibration force produced by a front-side shaft is effectively transmitted to wheels over an entire vibration frequency range in a vibration test.

A vehicle vibration device (e.g., a vehicle vibration device 1, described below) includes: a first shaft (e.g., a first shaft 7, described below) and a second shaft (e.g., a second shaft 8, described below) extending in a left-right direction at such a spacing that each of wheels (e.g., wheels W, described below) of a vehicle to be inspected (e.g., a vehicle 2, described below) is sandwiched therebetween in a front-rear direction and a movement mechanism (e.g., a movement mechanism 10, described below) that moves the first shaft, the first shaft being moved in a front-rear and horizontal direction by the movement mechanism to excite the wheel to vibration in front-rear and up-down directions. In the vehicle vibration device, a support member (e.g., a support member 22, described below) that supports the wheel from below is provided between the first shaft and the second shaft.

The vehicle vibration device described in (1), further includes a supporting force variable mechanism (e.g., a supporting force variable mechanism 23, described below) that varies a supporting force on the wheel by the support member in response to a vibration frequency.

The vehicle vibration device described in (2), in which the supporting force variable mechanism moves the support member between a position contacting the wheel and a position spaced apart from the wheel in response to a vibration frequency.

In the vehicle vibration device described in (1), the wheel is sandwiched in the front-rear direction between the first shaft and the second shaft extending in the left-right direction, and is supported from below at a position between the first shaft and the second shaft by the support member when the first shaft is moved in the front-rear and horizontal direction to excite the wheel to vibration in the front-rear and up-down directions. Accordingly, a circumferential deflection of the wheel is suppressed, and a vibration force produced by the first shaft is sufficiently transmitted to the wheel, thereby making it possible to perform effective vibration.

In the vehicle vibration device described in (2), the supporting force variable mechanism varies the supporting force on the wheel by the support member in response to the vibration frequency. Accordingly, a circumferential deflection of the wheel is suppressed in a vibration frequency range where a vibration force produced by the first shaft is not sufficiently transmitted to the wheel due to the deflection, thereby making it possible to perform effective vibration over an entire vibration frequency range.

In the vehicle vibration device described in (3), the supporting force variable mechanism moves the support member between a position contacting the wheel and a position spaced apart from the wheel in response to the vibration frequency, thereby making it possible to perform effective vibration over an entire vibration frequency range with a simple configuration.

BRIEF DESCRIPTION OF THE DRAWINGS

FIG. 9C is a diagram illustrating a function in a case where the sliding plate is interposed between the support member and the wheel;

DETAILED DESCRIPTION OF THE INVENTION

Figure 1:
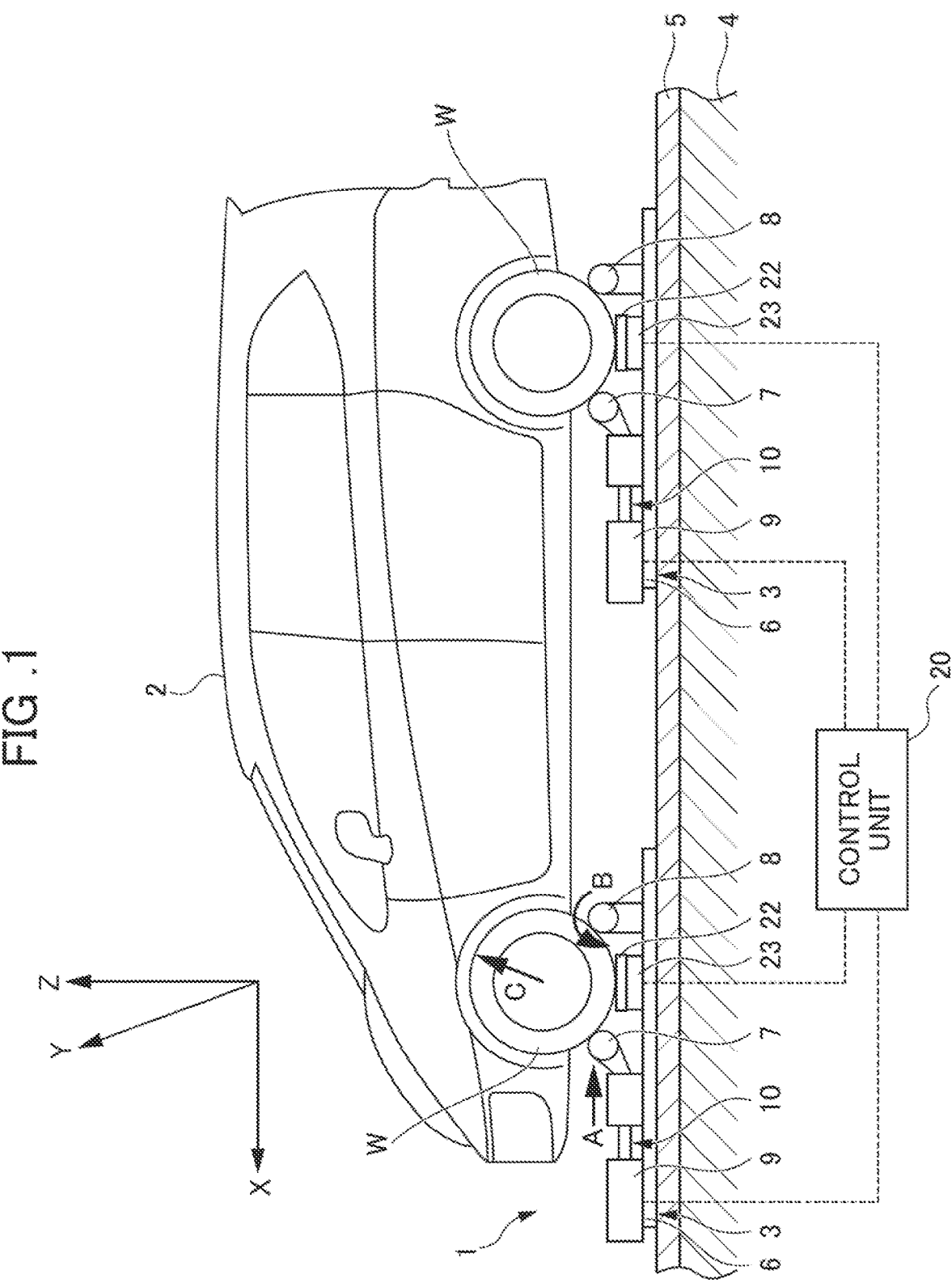
FIG. 1 is a conceptual diagram illustrating how a vehicle to be inspected is excited to vibration by a vehicle vibration device according to an embodiment of the present invention.
Figure 2:
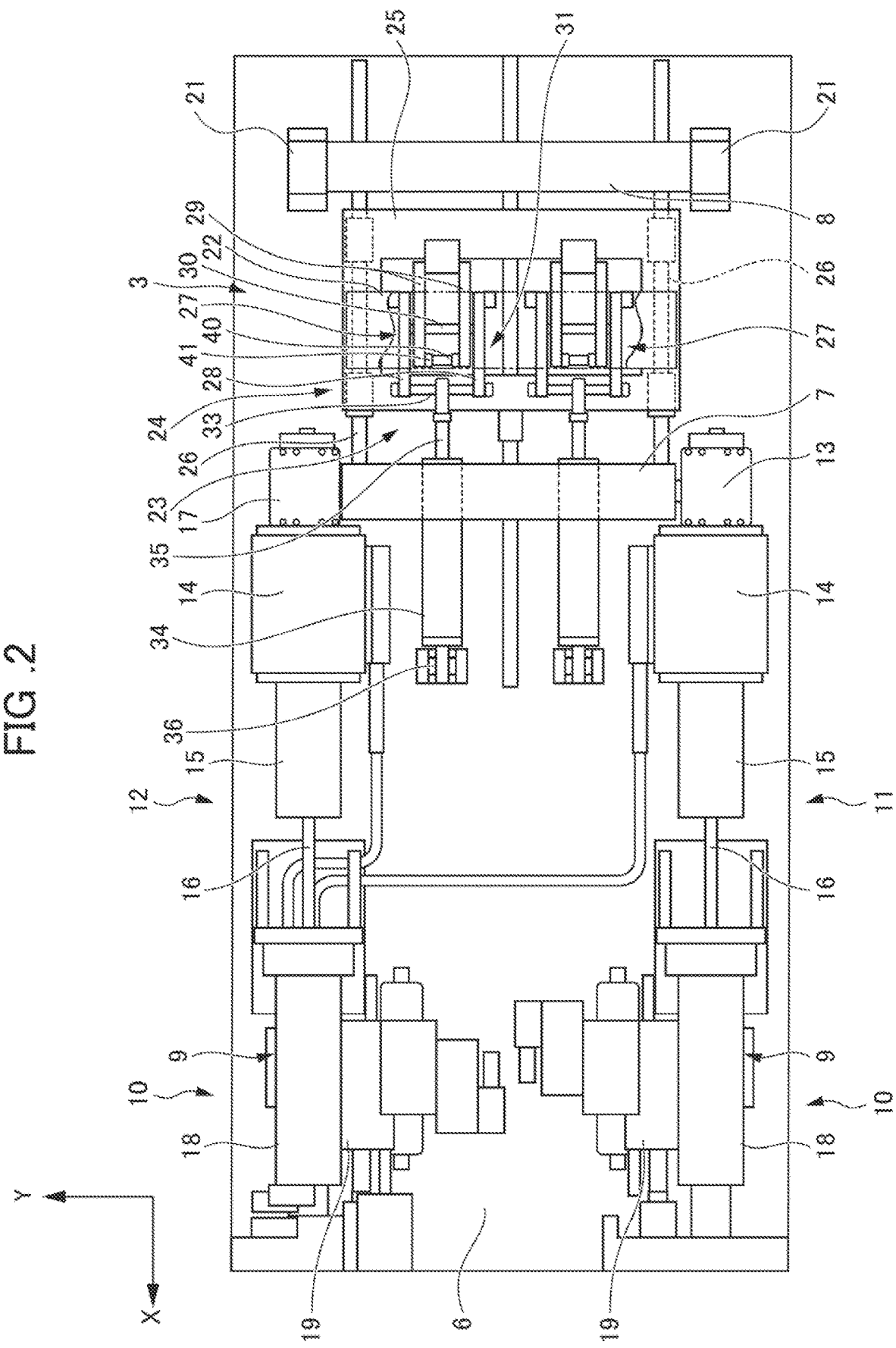
FIG. 2 is a diagram illustrating a configuration of one vibration table portion of the vehicle vibration device illustrated in FIG. 1.

Then, an embodiment of the present invention will be described with reference to the drawings. In the following drawings, identical or corresponding portions are respectively assigned the same reference numerals. FIG. 1 is a conceptual diagram illustrating how a vehicle as a vehicle to be inspected is excited to vibration by a vehicle vibration device 1 according to the embodiment of the present invention. FIG. 2 is a diagram illustrating a configuration of one vibration table portion of the vehicle vibration device 1.

The vehicle vibration device 1 includes four vibration tables 3 respectively corresponding to four wheels W of a vehicle 2 as a vehicle to be inspected. The four vibration tables 3 respectively have similar configurations. The vibration tables 3 are provided at positions respectively corresponding to the four wheels W of the vehicle 2 on a plate-shaped base d horizontally fixed to a horizontal floor 4 of a rigid structure such as a test building. As illustrated in FIG. 1, a front-rear (vehicle length) direction, a left-right (vehicle width) direction, and an up-down (vertical) direction of the vehicle 2 in a case where the vehicle 2 is installed at a normal position when the vehicle 2 is tested by the vehicle vibration device 1 are respectively indicated by an X-axis, a Y-axis, and a Z-axis. In the following description, notation in each of the front-rear, left-right, and up-down directions has the above-described meaning, until stated otherwise.

Each of the vibration tables 3 is configured on a movable base plate 6 placed on the base 5. That is, a first shaft 7 as a front-side shaft and a second shaft 8 as a rear-side shaft that are spaced apart from each other to sandwich the corresponding wheel W of the vehicle 2 therebetween in the front-rear direction and extend in the left-right direction and a movement mechanism 10 including an actuator 9 are provided on the movable base plate 6 to constitute the vibration table 3. The actuator 9 moves the first shaft 7 in a front-rear and horizontal direction. A total of four vibration tables 3 are provided to respectively correspond to the four wheels W of the vehicle 2.

As illustrated in FIG. 1, in the vibration table 3 in the vehicle vibration device 1, the wheel W is sandwiched in the front-rear direction between the first shaft 7 and the second shaft 8. When the first shaft 7 is moved in a horizontal direction using a driving force, indicated by an arrow A, produced by the actuator 9 in the movement mechanism 10, the second shaft 8 rotates as indicated by an arrow B, and the wheel W is displaced toward the upper side inclined in the front-rear direction as indicated by an arrow C. Driving by the actuator 9 is set to reciprocating movement, to excite the wheel W to vibration in the front-rear and up-down directions.

The movement mechanism 10 is a general term for a left-side movement mechanism 11 that applies a driving force for movement toward the left end side of the first shaft 7 and a right-side movement mechanism 12 for applying a driving force for movement toward the right end side of the first shaft 7. The left-side movement mechanism 11 and the right-side movement mechanism 12 respectively have similar configurations. Accordingly, the left-side movement mechanism 11 and the right-side movement mechanism 12 are appropriately referred to as a movement mechanism 10 without being distinguished.

Referring to FIG. 2, the left end side of the first shaft 7 is connected by a first joint 13 to one end (a rear end) of a vibration shaft 15 on the left side movably supported in the front-rear direction by a hydrostatic bearing 14. The right end side of the first shaft 7 is connected by a second joint 17 to one end (a rear end) of a vibration shaft 15 on the right side movably supported in the front-rear direction by a hydrostatic bearing 14. The other end (a front end) of each of the vibration shafts 15 is coaxially connected to a driving shaft 16 of the actuator 9.

The actuator 9 includes a hydraulic cylinder 18 that outputs a driving force in the front-rear direction of the driving shaft 16 and a hydraulic circuit 19 that operates the hydraulic cylinder 18. The hydraulic circuit 19 operates under control of a control unit 20 illustrated in FIG. 1. As a result, the vibration shaft 15 operates to reciprocate in its axial direction. Therefore, the first shaft 7 is displaced in the front-rear direction while remaining parallel to the left-right direction (a Y-axis direction) or maintaining a posture inclined at a predetermined angle in the left-right direction (the Y-axis direction) depending on a protruding amount of each of the vibration shafts 15 respectively connected to both the end sides thereof. In the present embodiment, the first shaft 7 does not rotate around its axis. The first shaft 7 may rotate around the axis.

On the other hand, the second shaft 8 extends in the left-right direction on the movable base plate 6, and is fixed to the movable base plate 6 to be rotatable around its own axis by fixing members 21 on both end sides thereof. Rotation around the axis of the second shaft 8 is a passive rotational displacement caused by a rotational displacement of the wheel W.

In a state illustrated in FIG. 2, both the actuators 9 in the left-side movement mechanism 11 and the right-side movement mechanism 12 are respectively in states where the driving shafts 16 are equally most retracted. Accordingly, the vibration shafts 15 in the left-side movement mechanism 11 and the right-side movement mechanism 12 are respectively at positions equally most retracted.

As a result, the first shaft 7 is in a state where it is parallel to the second shaft 8 extending in the left-right direction, as illustrated in FIG. 2. A position where the vibration shaft 15 has retracted is a position relatively corresponding to the front side of the vehicle 2 illustrated in FIG. 1 ahead and behind of the vehicle 2. Therefore, a position where each of the vibration shafts 15 has protruded is a position relatively corresponding to the rear side of the vehicle 2 illustrated in FIG. 1 ahead and behind of the vehicle 2.

A support member 22 that supports the wheel W of the vehicle 2 as a vehicle to be inspected from below is disposed between the first shaft 7 and the second shaft 8. The support member 22 is supported by a supporting force variable mechanism 23 provided on the movable base plate 6. The supporting force variable mechanism 23 is a mechanism that varies a supporting force on the wheel W by the support member 22 in response to a vibration frequency under control of the control unit 20. Respective functional portions of the support member 22, the supporting force variable mechanism 23, and the control unit 20 constitute a support mechanism section 24 that supports the wheel W of the vehicle 2 as a vehicle to be inspected from below between the first shaft 7 and the second shaft 8.

Figure 3:
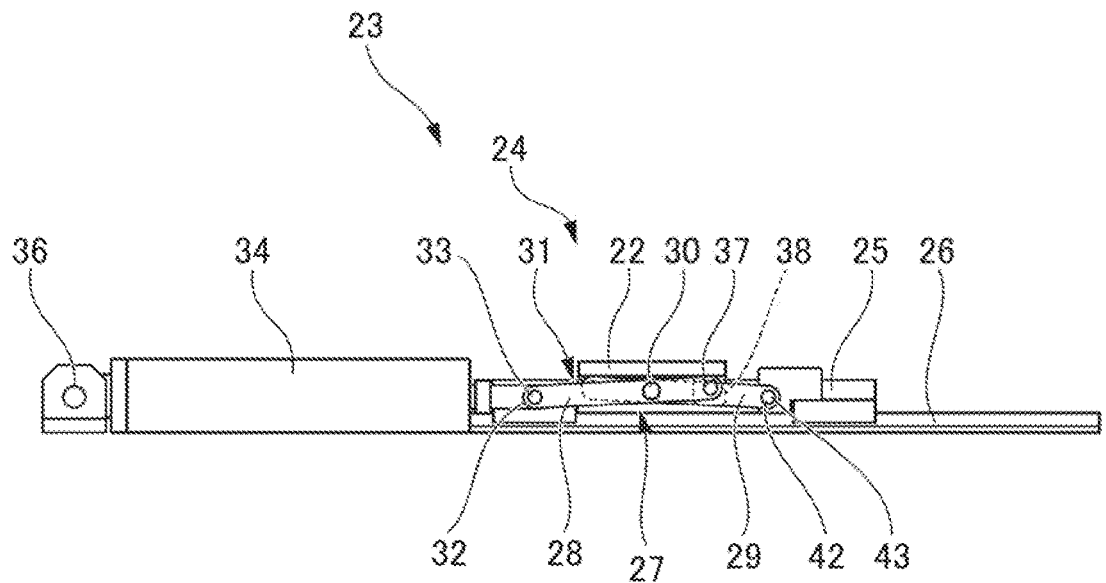
FIG. 3 is a diagram illustrating a supporting force variable mechanism when a support member in the vehicle vibration device illustrated in FIG. 1 is at a most lowered position.
Figure 4:
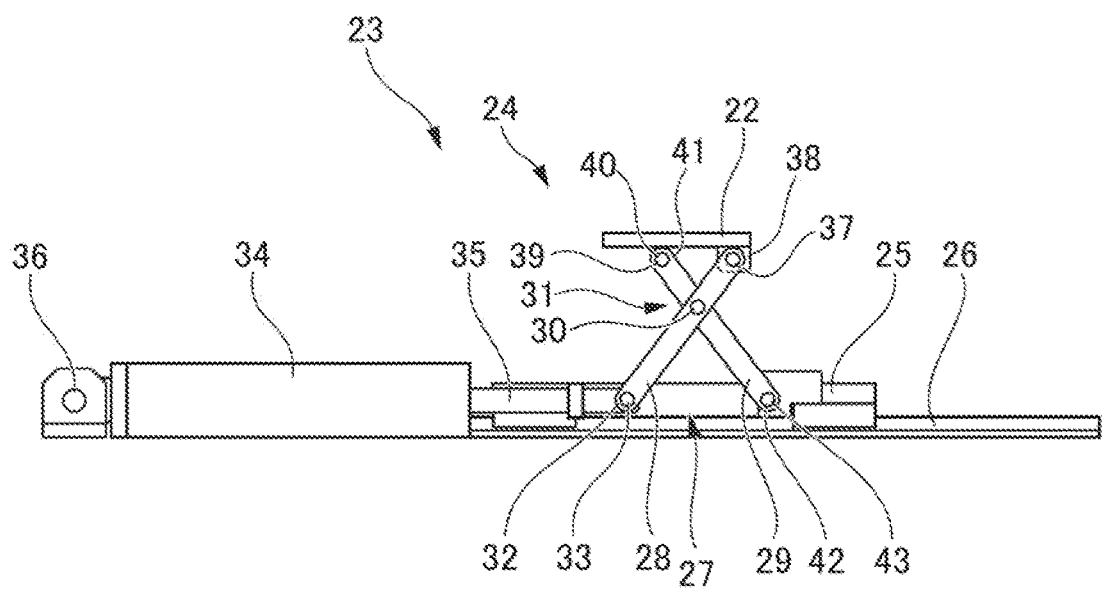
FIG. 4 is a diagram illustrating the supporting force variable mechanism when the support member in the vehicle vibration device illustrated in FIG. 1 is at a most raised position.

Referring to FIGS. 3 and 4 together with FIG. 2, the support mechanism section 24 will be described. FIG. 3 is a diagram illustrating the supporting force variable mechanism 23 in a case where the support member 22 in the vehicle vibration device 1 is at a most lowered position. FIG. 4 is a diagram illustrating the supporting force variable mechanism 23 in a case where the support member 22 in the vehicle vibration device 1 is at a most raised position. The support member 22 in the support mechanism section 24 is located between the first shaft 7 and the second shaft 8 in a downwardly planar view in a Z-direction (FIG. 1) illustrated in FIG. 2. The support member 22 is a plate-shaped member having a rectangular shape extending in the left-right direction as a Y-direction illustrated in FIG. 2 in a planar view, and its long side on the rear side in the front-rear direction is parallel to the second shaft 8.

A base frame 25 as a plate-shaped frame body is disposed in close proximity to an upper surface of the movable base plate 6 between the first shaft 7 and the second shaft 8. As external dimensions in a planar view of the base frame 25, the side in the left-right direction of the base frame 25 is substantially equal to the long side of the support member 22, and the side in the front-rear direction of the base frame 25 is larger than the short side of the support member 22. The base frame 25 is movable in the front-rear direction upon being guided by a pair of linear guide members 26 provided parallel to the upper surface of the movable base plate 6 in the front-rear direction, and is clamped upon being appropriately aligned in the front-rear direction.

Two X-link mechanisms 27 are provided side by side at a predetermined spacing in the left-right direction on the base frame 25. The support member 22 is supported to be movable up and down by the two X-link mechanisms 27. The two X-link mechanisms 27 respectively have similar configurations, and are configured side by side such that paired single X-links 31 each obtained by connecting a first link 28 and a second link 29 to be rotatable relative to each other by an intersection connection shaft 30 in an intersection connection site at the center of an X shape oppose each other with the second links 29 are located inside.

Respective movable supports 32 on the one end sides of the first links 28 in the pair of single X-links 31 are connected to each other by a driven connection rod 33 extending in the left-right direction. A distal end portion of a driving rod 35 protruding from one end of a driving cylinder 34 is connected to an intermediate position in the left-right direction as a longitudinal direction of the driven connection rod 33. The driving cylinder 34 is disposed to extend in the front-rear direction on the movable base plate 6, and the other end side thereof is attached to the movable base plate 6 by a bearing member 36. A fixed support 37 on the other end side of each of the first links 28 is pivotally supported on a bearing member 38 provided at a position facing a front edge on a lower surface of the support member 22.

Respective movable supports 39 on the one end sides (i.e., the sides facing the support member 22) of the second links 29 in the pair of single X-links 31 are connected to each other by a movement roller shaft 40 extending in the left-right direction. The movement roller shaft 40 has a coaxial movement roller 41, and the movement roller 41 moves in the front-rear direction by coming in rolling contact with the lower surface of the support member 22. A fixed support 42 on the other end side of each of the second links 29 is pivotally supported on a bearing section 43 in the base frame 25.

As illustrated in FIG. 3, each of the first links 28 and each of the second links 29 in the pair of single X-links 31 are not horizontal when the support member 22 is at the most lowered position, but both respectively remain in postures having inclination angles of approximately three degrees, for example, to the horizontal. A mechanism for causing the first link 28 and the second link 29 to respectively remain in the postures may be a mechanism for maintaining the postures at the above-described inclination angle by penetrating a locking rod through a through hole provided at a position spaced apart from the fixed support 42 by a predetermined distance in the second link 29 so as to be retractable in the left-right direction, illustration of which is omitted. In this case, the locking rod may be integral with a shaft protruding and retracting in the left-right direction in a solenoid plunger provided at an appropriate position.

The support mechanism section 24 provides a displacement for raising and lowering the support member 22 in the Z-direction when the driving cylinder 34 responds to a servo command from a wheel supporting force control unit 44, described below, in the control unit 20, to cause the support member 22 to contact or separate from the wheel W with a target supporting force. As illustrated in FIG. 3, when the driving rod 35 in the driving cylinder 34 is in a most retracted state, the driven connection rod 33 in the X-link mechanism 27 is located at a foremost position of a movement range.

At this time, the movable support 32 of each of the first links 28 in the pair of single X-links 31 is located at a foremost position of a movement range, and the fixed support 37 in the first link 28 and the movable support 39 in the second link 29 that support the support member 22 respectively enter states where they have been lowered to most lowered positions. Correspondingly, the support member 22 is located at the most lowered position, and does not contact the wheel W. As described above, in this state, each of the first links 28 and each of the second links 29 in the pair of single X-links 31 are not horizontal, but both respectively remain in postures having inclination angles of approximately three degrees, for example, to the horizontal.

When the driving rod 35 in the driving cylinder 34 protrudes, the driven connection rod 33 in the X-link mechanism 27 moves backward in the movement range. Correspondingly, the movable support 32 of each of the first links 28 in the pair of single X-links 31 moves backward in the movement range. The first link 28 and the second link 29 respectively have inclination angles to the horizontal. Accordingly, a component force in a vertical direction is exerted on the first link 28 and the second link 29 from the starting point when the driving rod 35 begins to protrude. Thus, a malfunction on an operation such as so-called locking does not occur. By this movement, the movable support 32 in each of the first links 28 in the pair of single X-links 31 approaches the fixed support 42 in the second link 29. The pair of single X-links 31 each gradually changes to exhibit an X type in FIG. 4.

In such a change process, there occurs a displacement in which a spacing between the fixed support 37 in the first link 28 and the movable support 32 in the second link 29 that support the support member 22 narrows. In such a displacement process, the movement roller 41 coaxial with the movement roller shaft 40 of the movable support 39 in the second link 29 supports the support member 22 by coming in rolling contact with its lower surface. Respective height positions of both the fixed support 37 in the first link 28 and the movable support 39 in the second link 29 are always uniform in principle of an X-link. Therefore, the support member 22 rises with its main surface kept horizontal, and contacts the wheel W. When a driving force produced by the driving cylinder 34 is adjusted in response to a servo command, a supporting force on the wheel W by the support member 22 is adjusted.

Figure 5:
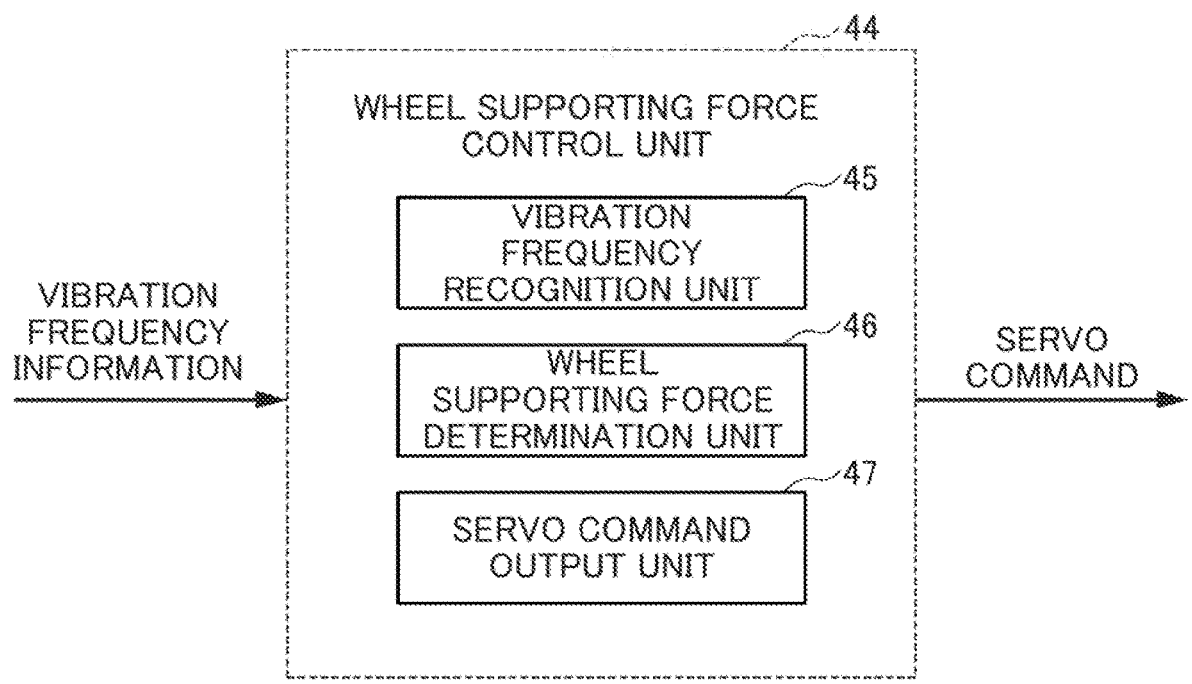
FIG. 5 is a functional block diagram relating to wheel supporting force control in a control unit in the vehicle vibration device illustrated in FIG. 1.

FIG. 5 is a functional block diagram relating to wheel supporting force control in the control unit 20 in the vehicle vibration device 1 illustrated in FIG. 1. The supporting force variable mechanism 23 that adjusts a supporting force on the wheel by the support member 22 operates under control of the wheel supporting force control unit 44 as a functional portion relating to this adjustment in the control unit 20. The wheel supporting force control unit 44 includes a vibration frequency recognition unit 45, a wheel supporting force determination unit 46, and a servo command output unit 47.

The vibration frequency recognition unit 45 recognizes a time-dependent vibration frequency in a so-called sweep vibration test for performing a vibration test by changing a vibration frequency within a predetermined frequency range to gradually rise or fall. This recognition is formed by receiving vibration frequency information from a sweep generator as a vibration frequency generation source in the control unit 20. The wheel supporting force determination unit 46 determines a wheel supporting force to be applied at the vibration frequency recognized by the vibration frequency recognition unit 45.

The servo command output unit 47 generates a servo command to generate a wheel supporting force corresponding to the determination in the wheel supporting force determination unit 46. The driving cylinder 34 in the support mechanism section 24 operates based on the servo command, and the support member 22 supports the wheel with an appropriate supporting force via the X-link mechanism 27. If the wheel supporting force determination unit 46 determines that the supporting force is not applied to the wheel, the servo command output unit 47 generates a servo command to retract the driving rod 35 in the driving cylinder 34 such that the X-link mechanism 27 enters a most lowered state illustrated in FIG. 3.

Figure 6A:
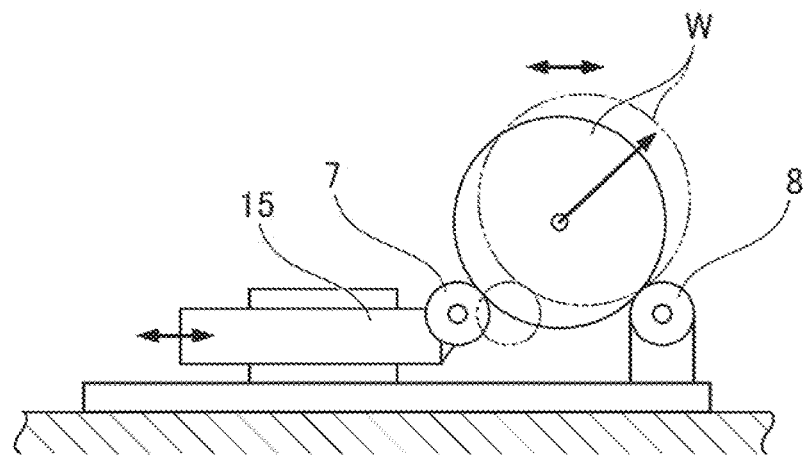
FIG. 6A is a schematic view illustrating a state where support by the support member in the vehicle vibration device illustrated in FIG. 1 is invalidated.
Figure 6B:
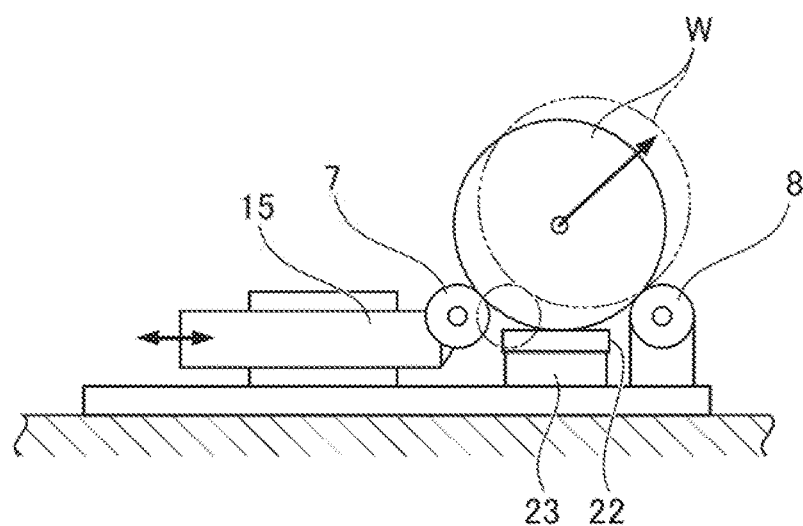
FIG. 6B is a schematic view illustrating a state where support by the support member in the vehicle vibration device illustrated in FIG. 1 is validated.

FIG. 6A is a schematic view illustrating a state where support of the wheel W by the support member 22 in the vehicle vibration device 1 is invalidated. FIG. 6B is a schematic view illustrating a state where support of the wheel W by the support member 22 in the vehicle vibration device 1 is validated. The state illustrated in FIG. 6A corresponds to a case where the supporting force variable mechanism 23 is in the state illustrated in FIG. 3. The state illustrated in FIG. 6B corresponds to a case where the supporting force variable mechanism 23 is in the state illustrated in FIG. 4. With a vibration displacement in the front-rear and horizontal direction of the vibration shaft 15, the first shaft 7 as the front-side shaft repeats a displacement of proximity and separation to and from the second shaft 8 as the rear-side shaft. Correspondingly, the wheel W that contacts the first shaft 7 and the second shaft 8 is vibrationally displaced in a direction inclined slightly forward with respect to the vertical direction as a whole while being distorted in the circumferential direction in response to the displacement of the first shaft 7.

As illustrated in FIG. 6A, with the supporting force from the support member 22 not exerted on the wheel W, a vibration force produced by the first shaft 7 is not sufficiently transmitted to the wheel W in a specific vibration frequency range due to a deflection in the circumferential direction of the wheel W. The inventor has grasped that a transmission efficiency of an acceleration occurring in the wheel W due to vibration by the first shaft 7 exhibits a characteristic as illustrated in FIGS. 7 and 8 under a certain condition as a result of various experiments.

Figure 7:
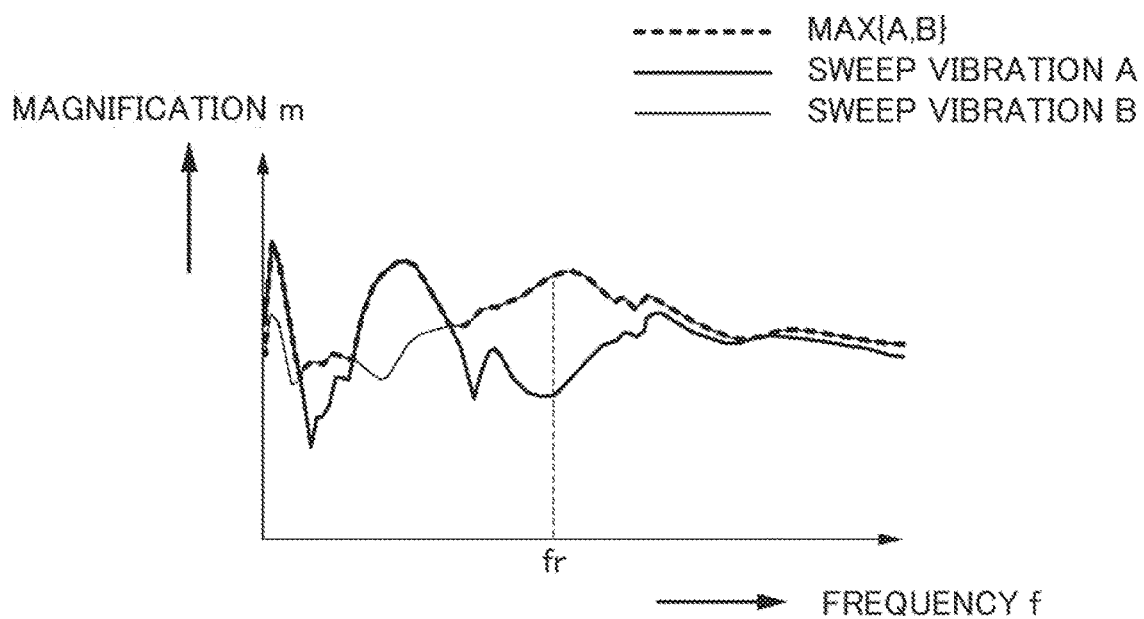
FIG. 7 is a diagram illustrating a transmission function of a vibration occurring on the side of a vehicle to be inspected for vibration by the vehicle vibration device illustrated in FIG. 1 through comparison between the respective states illustrated in FIGS. 6A and 6B.
Figure 8:
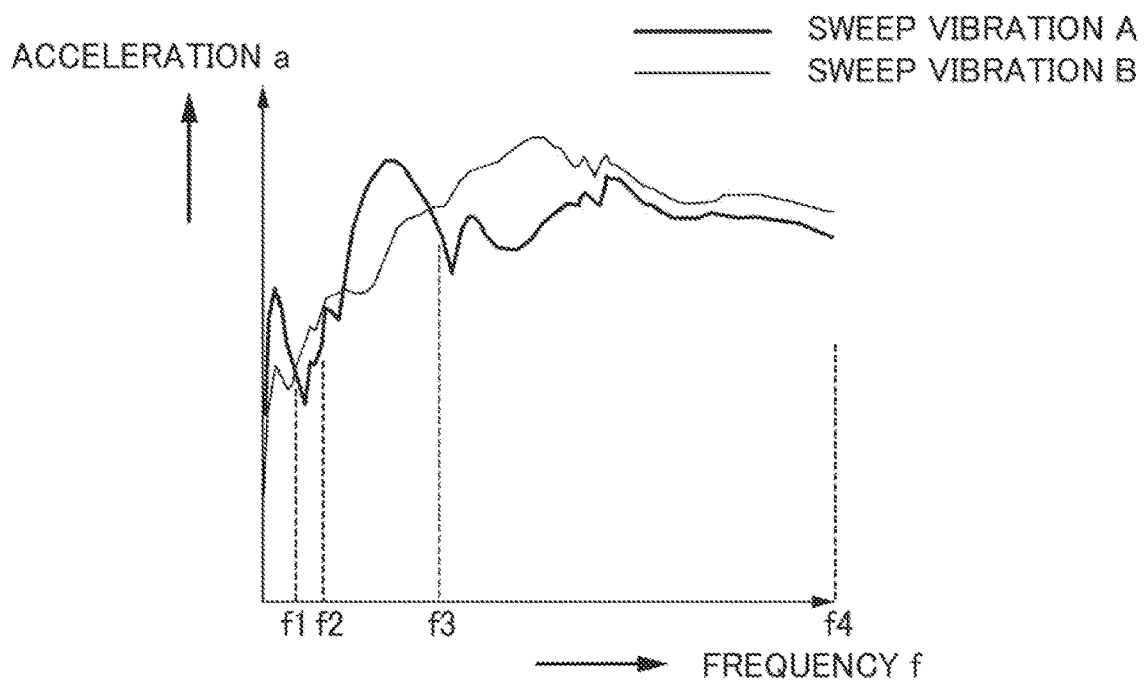
FIG. 8 is a diagram illustrating a frequency spectrum of an acceleration value occurring on the side of the vehicle to be inspected for vibration by the vehicle vibration device illustrated in FIG. 1 through comparison between the respective states illustrated in FIGS. 6A and 6B.

FIG. 7 is a diagram illustrating a transmission function of a vibration occurring on the side of the vehicle to be inspected 2 (the wheel W) with respect to vibration by the vehicle vibration device 1 through comparison between the respective states illustrated in FIGS. 6A and 6B. Setting of the state as illustrated in FIG. 6A and setting of the state as illustrated in FIG. 6B are respectively appropriately referred to as a condition A and a condition B. Sweep vibration A is vibration in which a vibration frequency is gradually raised under the condition A, and sweep vibration B is vibration in which a vibration frequency is gradually raised under the condition B.

In FIG. 7, a characteristic curve A corresponds to the condition A, and a characteristic curve B corresponds to the condition B. In FIG. 7, a vertical axis represents a transmission function B(f)/K(f) as a vibration acceleration B(f) of the wheel W as a response acceleration to a vibration acceleration K(f) of the first shaft 7 as an input acceleration to the wheel W and its value expressed by a magnification m. A horizontal axis represents a frequency and a variable range of a frequency a band of which relates to sweep vibration. If the value of the magnification m is high, a vibration force produced by the first shaft 7 is effectively transmitted to the wheel W. Therefore, if vibration is performed under the condition A or the condition B corresponding to Max(A, B) having the higher value out of the characteristic curve A and the characteristic curve B for the frequency relating to sweep vibration, efficient vibration can be performed.

Although the vibration under the condition B has a higher efficiency than that under the condition A in the overall frequency range relating to sweep vibration, it is found that the value of m in the vibration under the condition B reaches approximately ten times that in the vibration under the condition A at a specific frequency fr. As illustrated in FIG. 7, there is also a region where the vibration under the condition A has a higher efficiency within the frequency range relating to sweep vibration.

FIG. 8 is a diagram illustrating a frequency spectrum of an acceleration occurring on the side of the vehicle to be inspected 2 (the wheel W) with respect to vibration by the vehicle vibration device 1 through comparison between the respective states illustrated in FIGS. 6A and 6B. In FIG. 8, sweep vibration A is also vibration in which a vibration frequency is gradually raised under the condition A, and sweep vibration B is also vibration in which a vibration frequency is gradually raised under the condition B.

A characteristic curve A is a frequency spectrum of the acceleration a under the condition A, and a characteristic curve B is a frequency spectrum of the acceleration a under the condition B. The higher a value expressed by the acceleration a is, the higher the efficiency of vibration is. For the vibration efficiency, the vibration under the condition A is excellent from a frequency 0 to a frequency f1, and the vibration under the condition B is excellent above the frequency f1 up to a frequency f2, as can be read from FIG. 8. Then, the vibration under the condition A is excellent above the frequency f2 up to a frequency f3. Further, the vibration under the condition B is excellent above the frequency f3 up to an upper-limit frequency f4 relating to sweep vibration.

In the vehicle vibration device 1, the condition A (FIG. 6A) or the condition B (FIG. 6B) is selectively applied such that highly efficient vibration is performed depending on a characteristic to be read from FIGS. 7 and 8 in response to a vibration frequency. When a supporting force on the wheel W by the support member 22 is adjusted even under the condition B, more efficient vibration can be implemented. That is, the supporting force variable mechanism 23 is operated, as described above, to adjust a supporting force on the wheel W by the support member 22 under control of the wheel supporting force control unit 44 in the control unit 20.

With the vehicle vibration device according to the present embodiment, the following effects are produced.

In a vehicle vibration device 1 described in (1), including a first shaft 7 and a second shaft 8 extending in a left-right direction at such a spacing that each of wheels W of a vehicle to be inspected 2 is sandwiched therebetween in a front-rear direction, and a movement mechanism 10 that moves the first shaft 7, the first shaft 7 being moved in a front-rear and horizontal direction by the movement mechanism 10 to excite the wheel W to vibration in front-rear and up-down directions, a support member 22 that supports the wheel W from below is provided between the first shaft 7 and the second shaft 8. The wheel W is supported from below by the support member 22. Accordingly, the disadvantage that a vibration force produced by the first shaft 7 is not sufficiently transmitted to the wheel W due to a circumferential deflection of the wheel W is reduced, thereby making it possible to perform efficient vibration so that power consumption required for a vibration test is reduced.

The vehicle vibration device 1 described in (2) includes a supporting force variable mechanism 23 that varies a supporting force on the wheel W by the support member 22 in response to a vibration frequency. Accordingly, a circumferential deflection of the wheel W is suppressed in a vibration frequency range where a vibration force produced by the first shaft 7 is not sufficiently transmitted to the wheel W due to the deflection, thereby making it possible to perform effective vibration over an entire vibration frequency range.

In the vehicle vibration device 1 described in (3), the supporting force variable mechanism 23 moves the support member 22 between a position contacting the wheel W and a position spaced apart from the vehicle W in response to a vibration frequency. This makes it possible to perform effective vibration over an entire vibration frequency range with a simple configuration.

Although the embodiment of the present invention has been described above, the present invention is not limited to the embodiment. A configuration of details may be appropriately changed within the spirit and scope of the present invention. For example, although the first shaft 7 is in the left-right direction (Y-axis direction) parallel to the second shaft 8 and such a relationship is maintained in the foregoing, an inclination angle of the first shaft 7 with respect to the left-right direction (Y-axis direction) may be variable. This is implemented when the left-side movement mechanism 11 and the right-side movement mechanism 12 operate to vibrate while the first shaft 7 maintains the inclination angle under control of the control unit 20. This makes it possible to perform a vibration test imitating a state where a crosswind has been exerted on a vehicle, for example.

In the vibration test, description of a phenomenon occurring when the wheel W is supported by the support member 22 and correspondence to the phenomenon will be complemented. As illustrated in FIG. 6B above, when the wheel W is excited to vibration by the first shaft 7, both the first shaft 7 and the wheel W do not rotate, and a contact site between the first shaft 7 and the wheel W is maintained as it is so that the wheel W is displaced back and forth. Therefore, the wheel W produces a large friction between itself and a surface of the support member 22. A load to be exerted on the surface of the support member 22 from the wheel W is large. Accordingly, if any countermeasure is not taken, a large lateral stress is exerted on the supporting force variable mechanism 23 (the support mechanism section 24) in the state illustrated in FIG. 4. As one measure, a sliding plate having a significantly small friction coefficient may be interposed between the surface of the support member 22 and the wheel W.

Figure 9A:
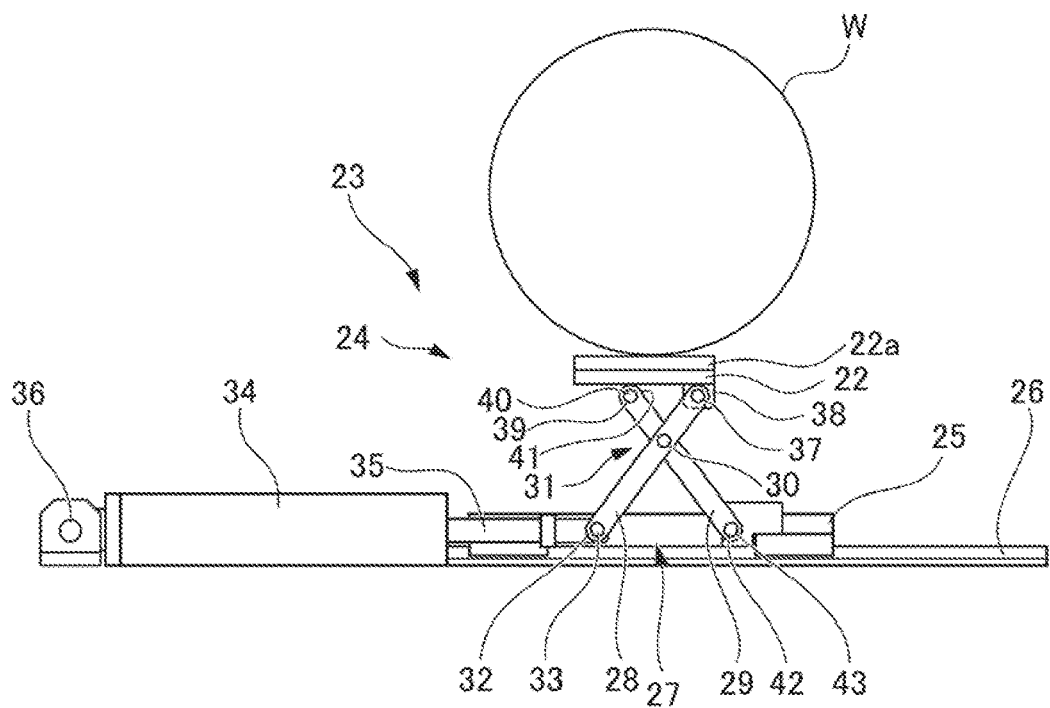
FIG. 9A is a diagram illustrating a function in a case where a sliding plate is interposed between the support member and a wheel.
Figure 9B:
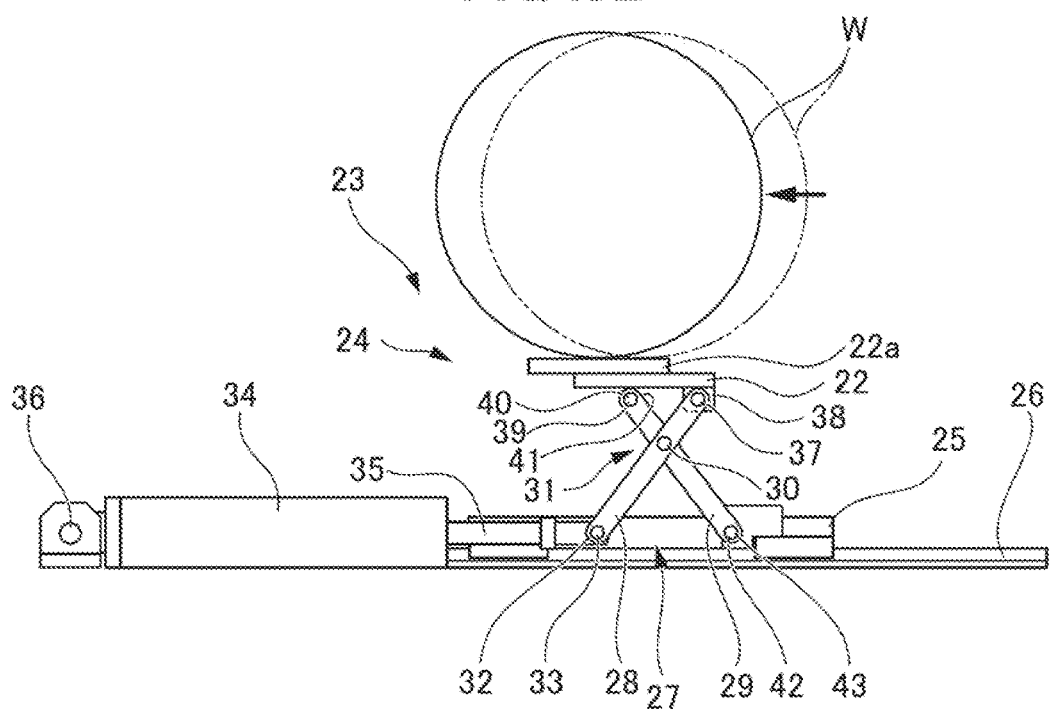
FIG. 9B is a diagram illustrating a function in a case where the sliding plate is interposed between the support member and the wheel.

FIGS. 9A, 9B, and 9C are diagrams for each describing a function in a case where such a sliding plate is interposed. FIG. 9A illustrates a state where the wheel W is at a central position of a displacement zone when the wheel W is displaced in the front-rear direction by vibration with a sliding plate 22a interposed between the surface of the support member 22 on the supporting force variable mechanism 23 (the support mechanism section 24) and the wheel W in the state illustrated in FIG. 4. The sliding plate 22a is subjected to Teflon (registered trademark) coating on its one surface or both its surfaces, and has a significantly small friction coefficient. FIG. 9B illustrates how the wheel W has been displaced forward by a vibration pulling operation from the state illustrated in FIG. 9A. In FIG. 9B, a position of the wheel W in the state illustrated in FIG. 9A is indicated by a two-dot and dash line. As the wheel W is displaced to a position indicated by a solid line, the sliding plate 22a is also displaced forward. However, at this time, a friction between the sliding plate 22a and the surface of the support member 22 is small. FIG. 9C illustrates how the wheel W is displaced backward by a vibration pushing operation from the state illustrated in FIG. 9A. In FIG. 9C, a position of the wheel W in the state illustrated in FIG. 9A is also indicated by a two-dot and dash line. As the wheel W is displaced to a position indicated by a solid line, the sliding plate 22a is also displaced backward. However, at this time, a friction between the sliding plate 22a and the surface of the support member 22 is small. Therefore, when the sliding plate 22a is interposed between the surface of the support member 22 and the wheel W, as described above, a disadvantage that an excessive lateral stress is applied to the supporting force variable mechanism 23 (the support mechanism section 24) can be effectively avoided.

EXPLANATION OF REFERENCE NUMERALS 1 vehicle vibration device
2 vehicle
3 vibration table
4 floor
5 base
6 movable base plate
7 front-side shaft (first shaft)
8 rear-side shaft (second shaft)
9 actuator
10 movement mechanism
11 left-side movement mechanism
12 right-side movement mechanism
13 first joint
14 hydrostatic bearing
15 vibration shaft
16 driving shaft
17 second joint
18 hydraulic cylinder 19 hydraulic circuit
20 control unit
21 fixing member
22 support member
22a sliding plate
23 supporting force variable mechanism
24 support mechanism section
25 base frame
26 linear guide member
27 X-link mechanism
28 first link
29 second link
30 intersection connection shaft
31 single X-link
32 movable support
33 driven connection rod
34 driving cylinder
35 driving rod
36 bearing member
37 fixed support
38 bearing member
39 movable support
40 movement roller shaft
41 movement roller
42 fixed support
43 bearing section
44 wheel supporting force control unit
45 vibration frequency recognition unit
46 wheel supporting force determination unit
47 servo command output unit

What is claimed is:

1. A vehicle vibration device comprising: a first shaft and a second shaft extending in a left-right direction at such a spacing that each of wheels of a vehicle to be inspected is sandwiched therebetween in a front-rear direction; and a movement mechanism that moves the first shaft, the first shaft being moved in a front-rear and horizontal direction by the movement mechanism to excite the wheel to vibration in front-rear and up-down directions, wherein a support member that supports the wheel from below is provided between the first shaft and the second shaft.

2. The vehicle vibration device according to claim 1, further comprising a supporting force variable mechanism that varies a supporting force on the wheel by the support member in response to a vibration frequency.

3. The vehicle vibration device according to claim 2, wherein the supporting force variable mechanism moves the support member between a position contacting the wheel and a position spaced apart from the wheel in response to a vibration frequency.

* * * * *